United States Patent Office.

ALEXANDER SCHANSCHIEFF, OF GIPSY HILL, COUNTY OF SURREY, ASSIGNOR TO THE SCHANSCHIEFF ELECTRIC BATTERY SYNDICATE, OF LONDON, ENGLAND.

NEW MERCURIC SALT FOR BATTERY-FLUIDS.

SPECIFICATION forming part of Letters Patent No. 379,820, dated March 20, 1888.

Application filed May 28, 1887. Serial No. 239,681. (Specimens.) Patented in England October 16, 1885, No. 12,378, and July 6, 1886, No. 8,832; in Germany December 25, 1885, No. 36,415, and in India October 15, 1886, No. 177.

*To all whom it may concern:*

Be it known that I, ALEXANDER SCHANSCHIEFF, a subject of the Emperor of Russia, residing at Gipsy Hill, in the county of Surrey, England, electrician, have invented a certain new and useful novel saline preparation applicable for use in galvanic batteries and the process for the manufacture of the same, (for which Letters Patent have been granted to me in the following countries, viz: Great Britain, No. 12, 378, October 16, 1885, and No. 8,832, July 6, 1886; Germany, No. 36,415, December 25, 1885, and India, No. 177, October 15, 1886,) of which the following is a specification.

This invention has for its object a novel saline preparation applicable for use in galvanic batteries and the process for the manufacture of the same. This saline matter is prepared from metallic mercury and sulphuric acid. It is, when free from impurities, a white salt freely soluble in water to such an extent that salt containing two pounds of metallic mercury is held in solution in a gallon of water. When so dissolved, it is suitable for use in my single fluid-battery, for which I have already applied for a patent, No. 210,455, in the year 1886. The way in which I prepare this salt is as follows: I add three pounds of sulphuric acid, specific gravity 1.846, to two pounds of metallic mercury. I boil until the metal is dissolved, and maintain the heat until the excess of acid is evaporated. When cold, I add one gallon (ten pounds) of water. This dissolves a part only, precipitation of basic sulphate of mercury taking place. I separate the solid residue, and this I then again boil with sulphuric acid, as before, in the proportion of two parts of the residue to three parts of acid. By boiling the residue is dissolved, and by continuing the heat the excess of acid is evaporated. I add the resulting mass, when cold, to the original aqueous solution, which dissolves a portion of the said mass, and I separate the residue. After three or four repetitions the whole is dissolved in the original gallon of water. The density of the liquid will then be 1.435 Baumé and the quantity about five quarts. Finally, I evaporate the liquid by heat until the salt is deposited in a solid state. I rake it out as it falls and pack it in closely-stoppered bottles, in which it may be kept for an indefinite time. When liquid is required for use in a battery, I pour one gallon of water on five pounds of the salt. It dissolves perfectly, leaving no residue; or if there be impurities, which render the liquid turbid, it may be filtered through paper. The solution is then ready for use in a battery with zinc and carbon elements.

I can produce the same salt by another process, as follows; but the process which I have already described is preferable: I dissolve metallic mercury in sulphuric acid and evaporate off the excess of acid, as already described. When cold, I dissolve the salt in three times its weight of water. Partial solution only, accompanied by precipitation, takes place. I then add strong sulphuric acid little by little and finally drop by drop, with constant agitation. The solution becomes gradually more and more complete, until finally it is perceived that the drop of sulphuric acid as it falls into the liquid produces a precipitate. The process is then stopped and the solution cooled and filtered. This is then evaporated, as already described, and yields in a dry state the novel saline material.

My improved preparation may be technically stated to be "yellow basic sulphate of mercury," (known as "turbeth mineral,") combined with bisulphate of mercury, the formula being as follows: $2HgO, SO_4 + HgSO_4 + 3H_2O$. Its solution is of a much higher specific gravity than any mercurial solution heretofore obtainable.

Having now particularly described and ascertained the nature of my said invention and in what manner the same is to be performed, I declare that what I claim is—

1. The herein-described novel salt, composed of yellow basic sulphate of mercury, combined with bisulphate of mercury, and having substantially the formula specified.

2. The herein-described novel saline solution, composed of a salt consisting of yellow basic sulphate of mercury, combined with bisulphate of mercury dissolved in water.

3. The process for the production of a saline preparation, consisting in dissolving mercury in sulphuric acid, evaporating the excess of acid, adding water to the resulting mass, and separating the precipitate, then treating this precipitate with acid and again with water, and so on, substantially as described, and either retaining the solution for use in the liquid form or evaporating the solution to obtain the solid salt.

4. The process for the production of a saline preparation, consisting in dissolving mercury in sulphuric acid, evaporating the excess of acid, adding water, then increasing the strength of the solution by the further addition of strong sulphuric acid, substantially as set forth.

5. The process for the production of a saline preparation, consisting in dissolving mercury in sulphuric acid, evaporating the excess of acid, adding water, then increasing the strength of the solution by adding sulphuric acid, and finally evaporating the liquid and producing the dry salt.

ALEXANDER SCHANSCHIEFF.

Witnesses:
HERBERT E. DALE,
WALTER J. SKERTEN,
*Both of 17 Gracechurch Street, London, E. C.*